(12) United States Patent
Wurzel et al.

(10) Patent No.: US 9,142,157 B2
(45) Date of Patent: Sep. 22, 2015

(54) METHODS FOR ENHANCING LONGEVITY IN ELECTRONIC DEVICE DISPLAYS

(75) Inventors: Joshua G. Wurzel, Sunnyvale, CA (US); David A. Doyle, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 499 days.

(21) Appl. No.: 13/010,660

(22) Filed: Jan. 20, 2011

(65) Prior Publication Data

US 2012/0188287 A1  Jul. 26, 2012

(51) Int. Cl.
*G09G 3/34* (2006.01)
*G09G 3/32* (2006.01)
*G06F 1/20* (2006.01)

(52) U.S. Cl.
CPC ............. *G09G 3/3208* (2013.01); *G06F 1/203* (2013.01); *G06F 1/206* (2013.01); *G09G 3/3406* (2013.01); *G09G 2320/041* (2013.01); *G09G 2320/0626* (2013.01)

(58) Field of Classification Search
USPC ....................................................... 345/690
See application file for complete search history.

(56) References Cited

U.S. PATENT DOCUMENTS

| | | | |
|---|---|---|---|
| 5,929,833 A | 7/1999 | Koshobu et al. | |
| 6,069,449 A * | 5/2000 | Murakami | 315/158 |
| 6,329,976 B1 | 12/2001 | Johnson et al. | |
| 6,789,921 B1 * | 9/2004 | Deloy et al. | 362/97.3 |
| 7,285,918 B2 * | 10/2007 | Chang | 315/169.3 |
| 2002/0130985 A1 | 9/2002 | Weindorf et al. | |
| 2005/0049729 A1 * | 3/2005 | Culbert et al. | 700/50 |
| 2007/0064421 A1 * | 3/2007 | Baba | 362/231 |
| 2008/0185976 A1 * | 8/2008 | Dickey et al. | 315/294 |
| 2009/0073109 A1 | 3/2009 | Shin et al. | |
| 2010/0007588 A1 | 1/2010 | Zygmunt et al. | |
| 2010/0194791 A1 * | 8/2010 | Ogi et al. | 345/691 |
| 2010/0237697 A1 | 9/2010 | Dunn et al. | |
| 2011/0109655 A1 * | 5/2011 | Takeda | 345/690 |
| 2012/0113164 A1 * | 5/2012 | Furukawa et al. | 345/690 |

FOREIGN PATENT DOCUMENTS

| | | | |
|---|---|---|---|
| EP | 1079361 | 2/2001 | |
| EP | 1220192 | 3/2002 | |
| JP | 2008209843 | 9/2008 | |
| KR | 1020070040999 | 4/2007 | |
| WO | WO 2010016440 A1 * | 2/2010 | .......... G02F 1/13357 |
| WO | WO 2011004520 A1 * | 1/2011 | |

* cited by examiner

*Primary Examiner* — Joseph Haley
(74) *Attorney, Agent, or Firm* — Treyz Law Group; G. Victor Treyz; Kendall P. Woodruff

(57) ABSTRACT

An electronic device may contain components such as a processor, video circuitry, camera flash, communications circuitry, and other components that may generate heat during operation. The device may have a display with a backlight unit that contains light-emitting diodes. Control circuitry within the electronic device can apply drive powers to the light-emitting diodes in a way that is sensitive to the operating temperature of the light-emitting diodes. The control circuitry can determine whether the temperature of the light-emitting diodes is elevated by determining which components are active in the device. Activity levels can be ascertained by gathering status information on each component. Temperature sensors may be used to make real time temperature measurements. Based on factors such as component activity levels and measured temperature values, the control circuitry can adjust the maximum allowed light-emitting diode drive power level to avoid overdriving the diodes during operation at elevated temperatures.

25 Claims, 14 Drawing Sheets

| | CPU | VIDEO | CAMERA STROBE | ACCESSORIES | DISPLAY BACKLIGHT |
|---|---|---|---|---|---|
| 56→ | L | L | L | L | H |
| | L | L | L | H | H |
| | L | L | H | L | H |
| | L | H | L | L | H |
| | H | L | L | L | H |
| 58→ | L | L | H | H | M |
| | ⋮ | | | | |
| 60→ | H | H | H | H | L |

| | CPU | VIDEO | CAMERA STROBE | ACCESSORIES | DISPLAY BACKLIGHT |
|---|---|---|---|---|---|
| 56→ | L | L | L | L | H |
| | L | L | L | H | H |
| | L | L | H | L | H |
| | L | H | L | L | H |
| | H | L | L | L | H |
| 58→ | L | L | H | H | M |
| | ⋮ | | | | |
| 60→ | H | H | H | H | L |

FIG. 9

METHODS FOR ENHANCING LONGEVITY IN ELECTRONIC DEVICE DISPLAYS

BACKGROUND

This relates generally to electronic devices, and more particularly, to controlling components such as displays in electronic devices to enhance display longevity.

Electronic devices often include displays. Displays such as organic light-emitting diode (OLED) displays contain pixels that produce illumination without using a separate backlight unit. Other displays such as liquid crystal displays have backlight units. Light sources such as fluorescent lamps and light-emitting diodes can be used to generate backlight in a backlight unit.

Heat may be produced by the operation of the light-emitting diodes and other components in an electronic device such as processing circuitry, camera flash units, communications circuits such as circuits involved in communicating with external equipment, video circuits, and other devices.

High-temperature operation can degrade the performance of displays. Light-emitting diode light output typically decreases over time. Light-emitting diode lifetimes are sometimes measured in terms of lumen (light output) depreciation. When light-emitting diodes are simultaneously operated at elevated drive power levels and elevated temperatures, lumen depreciation can be accelerated (i.e., light-emitting diode lifetimes may be shortened). In displays with light-emitting diode backlights, operation at elevated temperatures may therefore result in accelerated decreases in backlight brightness. Displays with fluorescent lamp backlighting can also be degraded when operated at elevated temperatures due to accelerated reductions in available mercury, poisoning of the cathode, and phosphor degradation. In organic light-emitting displays, undesirable color shifts can develop as a display ages. These color shifts can be accelerated when organic light-emitting diodes are operated at elevated temperatures.

One possible way to ensure that displays perform satisfactorily over their desired lifetimes involves permanently restricting their operating power to conservatively low levels. By operating organic light-emitting diode pixels and display backlights at low brightness levels, display lifetimes can be extended to satisfactory levels, even in the presence of elevated temperatures.

However, imposing this type of limit on the brightness of a display may not be acceptable to a user of an electronic device, because it may become difficult or impossible to view images on a display in bright conditions.

It would therefore be desirable to be able to provide improved ways to control the operation of electronic devices with displays.

SUMMARY

An electronic device may contain components such as a processor, a video driver circuit, a camera flash, communications chips, and other devices that have the potential to generate heat during operation. The device may have a display with a backlight unit that contains light-emitting diodes or a fluorescent lamp or the device may have a display such as an organic light-emitting diode display with individual light-emitting diode pixels. During operation of the display, control circuitry within the electronic device can apply drive powers to the display to control display brightness. For example, control circuitry can apply drive powers to light-emitting diodes or a fluorescent lamp in a display backlight unit or may control the brightness level associated with an array of organic light-emitting diode pixels.

In some situations, the brightness of the display need not be high. For example, in dim ambient lighting conditions, a user or software running on an electronic device may establish a low light setting for a display. In other situations, however, the brightness of the display should be set to higher level. For example, when operating a display outside in bright sunlight, it may be highly desirable to set the brightness level of the display at or near its highest possible value.

When component activity in the device is relatively high, however, the display structures in the device will be exposed to elevated operating temperatures. Because unfettered operation of a backlight or pixel array at the highest brightness setting when the display is at an elevated operating temperature may have an adverse impact on display lifetime, care should be taken when operating the electronic device at high display brightness settings and elevated operating temperatures.

To ensure that the lifetimes of a display is satisfactory, control circuitry within the electronic device can be configured to apply drive powers to the light-emitting diodes in a pixel array or backlight or drive powers for a fluorescent lamp in a backlight in a way that is sensitive to the operating temperature of the display. Operating scenarios in which the light-emitting diodes of a pixel array or display backlight or the fluorescent lamp in a backlight unit are simultaneously operated at high drive strengths and high temperatures can be avoided entirely or at least minimized, so as to preserve display lifetimes (e.g., to avoid lumen depreciation and undesirable color shifts).

The control circuitry can determine whether the temperature of the display is elevated by determining which components are active in the device. Activity levels can be ascertained by gathering status information on each component. For example, the activity level of a processor integrated circuit such as a microprocessor can be determined by ascertaining the rate of the clock that is being used to operate the processor. The activity level of a video driver can be ascertained by determining whether the video driver is actively supplying video signals to a display and by determining the amount of video data that is being processed. The activity levels of other components such as communications circuits can be determined by analyzing how much data is being handled or by otherwise ascertaining the loads being handled by the components. A flash unit can be considered to be active when it is being used or has just been used to provide illumination for an image.

The control circuitry can also determine whether the temperature of the display is elevated by making temperature measurements using temperature sensors. Temperature sensors may be mounted within the interior of an electronic device such as on a main logic board or on a flex circuit substrate on which light-emitting diodes for a display backlight are mounted. In devices such as devices with organic light-emitting diode displays, temperature sensors may be mounted adjacent to the displays to monitor display temperature. In backlit displays based on fluorescent lamps, temperature sensors may be located adjacent to the lamps to determine whether or not the lamps are operating at elevated temperatures.

Based on factors such as component activity levels and measured temperature values, the control circuitry can adjust the maximum allowed drive powers in an organic light-emitting diode display or the maximum allowed backlight drive power (e.g., the light-emitting diode drive power level for a light-emitting diode backlight or the fluorescent lamp drive power level for a backlight with a fluorescent lamp). In this way, the control circuitry can avoid overdriving the display pixels (in an organic light-emitting diode display) or backlight diodes or fluorescent lamp during operation at elevated temperatures. If, for example, component activity levels are minimal or temperature sensor data indicates the operating temperature of the display is low, the control circuitry can set the maximum allowed display pixel power level or backlight drive power level to its highest possible value. When sufficient component activity levels are detected during operation or when measured temperatures rise sufficiently due to large light-emitting diode drive powers or fluorescent lamp powers, heat from other internal components, and/or elevated temperatures in the local environment, the control circuitry can reduce the maximum allowed light-emitting diode pixel drive power level or backlight drive power level to a safe level for use at elevated temperatures. A user or device software may reduce the brightness in the display if desired by dimming the pixels in an array of organic light-emitting diodes or by dimming the backlight in a backlit display (e.g., to accommodate momentarily dimmed ambient lighting conditions), but activities that raise the brightness to unsafe levels will be prevented by bounding diode drive powers and fluorescent lamp powers with the reduced maximum allowed drive power level.

Further features of the invention, its nature and various advantages will be more apparent from the accompanying drawings and the following detailed description of the preferred embodiments.

BRIEF DESCRIPTION OF THE DRAWINGS

FIG. 9 is a table showing how light-emitting diodes for a display backlight may be operated at a drive power that is adjusted based at least partly on which other electronic device components are operating and producing heat in accordance with an embodiment of the present invention.

DETAILED DESCRIPTION

Electronic devices may include displays. Displays may be used to display visual information such as text and images to users.

Figure 1:
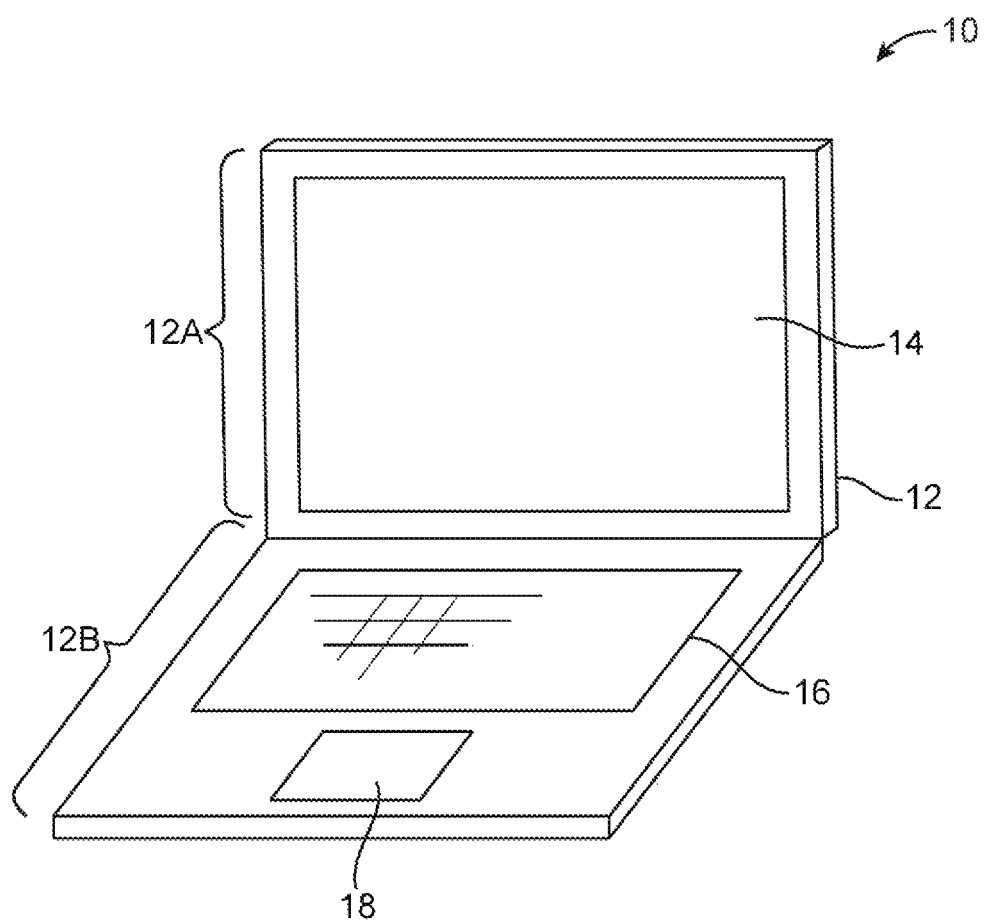
FIG. 1 is a perspective view of an illustrative electronic device such as a laptop computer with a backlit display in accordance with an embodiment of the present invention.
Figure 2:
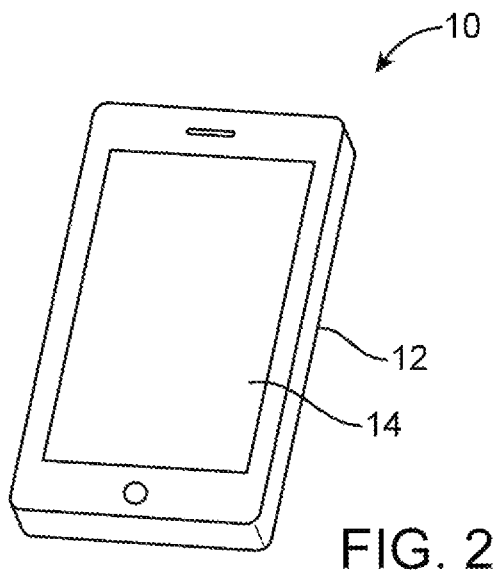
FIG. 2 is a perspective view of an illustrative electronic device such as a handheld electronic device with a backlit display in accordance with an embodiment of the present invention.
Figure 3:
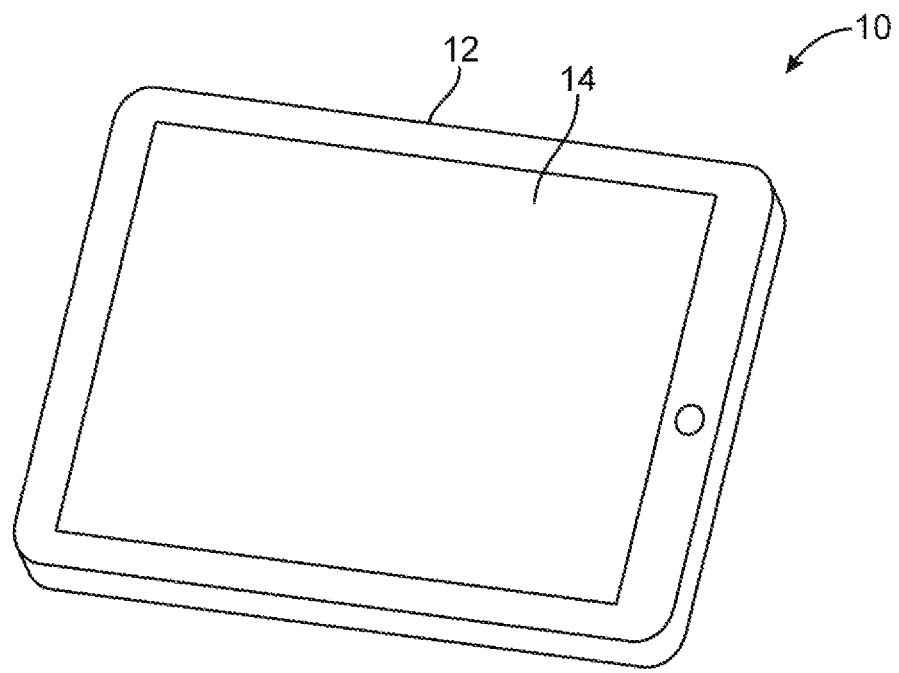
FIG. 3 is a perspective view of an illustrative electronic device such as a tablet computer with a backlit display in accordance with an embodiment of the present invention.

Illustrative electronic devices that may be provided with displays are shown in FIGS. 1, 2, and 3. FIG. 1 shows how electronic device 10 may have the shape of a laptop computer having upper housing 12A and lower housing 12B with components such as keyboard 16 and touchpad 18. FIG. 2 shows how electronic device 10 may be a handheld device such as a cellular telephone, music player, gaming device, navigation unit, or other compact device. FIG. 3 shows how electronic device 10 may be a tablet computer. These are merely illustrative examples. Electronic devices such as illustrative electronic device 10 of FIGS. 1, 2, and 3 may be laptop computers, computer monitors with embedded computers, tablet computers, cellular telephones, media players, other handheld and portable electronic devices, smaller devices such as wristwatch devices, pendant devices, headphone and earpiece devices, other wearable and miniature devices, or other electronic equipment.

Device 10 may have a housing such as housing 12. Housing 12, which is sometimes referred to as a case, may be formed of materials such as plastic, glass, ceramics, carbon-fiber composites and other composites, metal, other materials, or a combination of these materials. Device 10 may be formed using a unibody construction in which most or all of housing 12 is formed from a single structural element (e.g., a piece of machined metal or a piece of molded plastic) or may be formed from multiple housing structures (e.g., outer housing structures that have been mounted to internal frame elements or other internal housing structures).

Device 10 may have one or more displays such as display 14. Display 14 may be a liquid crystal display or a display that uses other types of display technology. Display 14 may, if desired, include capacitive touch sensor electrodes for a capacitive touch sensor array or other touch sensor structures (i.e., display 14 may be a touch screen).

Figure 4:
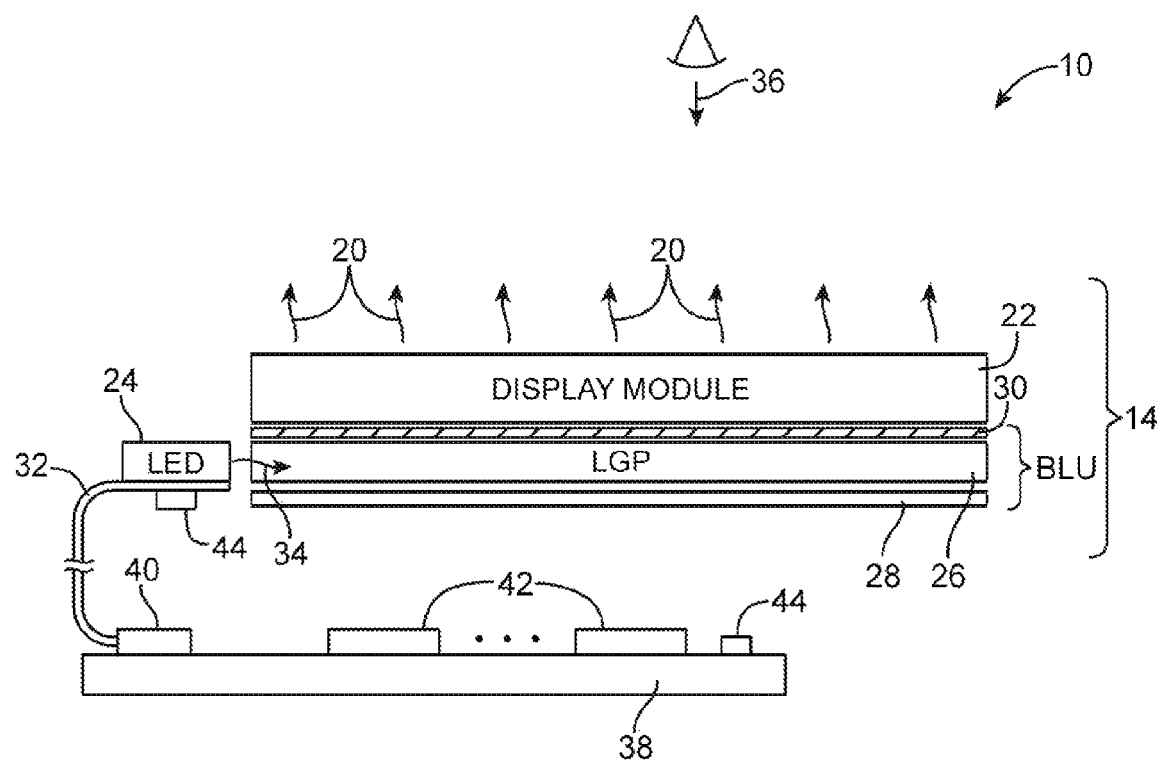
FIG. 4 is a cross-sectional side view of circuitry in an electronic device such as a display including a display module and associated backlight and a printed circuit board including control circuitry and other device components in accordance with an embodiment of the present invention.

A cross-sectional side view of an illustrative configuration that may be used for display 14 of device 10 (e.g., device 10 of FIG. 1, FIG. 2, or FIG. 3 or other suitable electronic devices) is shown in FIG. 4. As shown in FIG. 4, display 14 may include backlight structures such as backlight unit BLU for producing backlight 20. During operation, backlight 20 travels outwards (vertically upwards in the orientation of FIG. 4) and passes through image pixel structures in display module 22. This illuminates any images that are being produced by the pixels of display module 22 for viewing by a user of device 10. Display module 22 may be, for example, a liquid crystal display (LCD) module. Other display technologies may be used for display 14 if desired. The use of LCD technology is merely illustrative.

Backlight unit BLU may have a chassis (not shown) with an interior shape that receives components such as light-emitting diodes 24, light guide plate (LGP) 26, and reflector 28. Optical films 30 such as a diffuser layer and other films may be mounted over light guide plate 26. Light guide plate 26 may be formed from a layer of clear material such as a sheet of acrylic, polycarbonate, or other polymer. Reflector 28 may be formed from a reflective substance such as white polyester or a high-low dielectric stack.

Light-emitting diodes 24 may be attached to substrate 32. Substrate 32 may be a rigid printed circuit board or a flexible printed circuit substrate ("flex circuit") such as a sheet of polyimide or other flexible dielectric. During operation, light from light-emitting diodes 24 may be emitted in direction 34 and may be guided within light guide plate 26 by total internal reflection. Some of this light may escape upwards and may serve as backlight 20 for display 14. Reflector 28 may reflect any light that escapes plate 26 in the downwards direction up through display module 22 to add to the strength of backlight 20. Liquid crystal display module 22 may have upper and lower polarizers, a thin-film transistor layer, a color filter layer, and a layer of liquid crystal material that is interposed between the color filter layer and thin-film transistor layer (as an example). As backlight 20 travels through module 22, a user may view a backlit image from direction 36.

Substrate 32 may contain conductive traces (e.g., metal lines) that route signals between light-emitting diodes 24 and circuitry elsewhere in device 10. With one suitable arrangement, substrate 32 is connected to a main printed circuit board such as printed circuit board (PCB) 38 using flex-circuit-to-PCB connector 40. Circuitry for device 10 may be mounted on printed circuit boards such as board 38 and/or may be coupled to the circuitry on printed circuit board 38 through additional signal lines (e.g., signal lines on additional flex circuits, signal lines on additional rigid printed circuit boards, etc). This circuitry may include, for example, components 42.

Components 42 may include control circuitry such as control circuitry based on one or more processing integrated circuits (e.g., microprocessors) and storage (e.g., volatile and non-volatile memory). Components 42 may include communications circuits such as integrated circuits for communicating over serial buses and parallel buses with internal components and external equipment that is connected to device 10 by a cable and a connector in device 10 and/or internal circuits in device 10. Discrete components may be mounted on board 38 with other components. Examples of discrete components are inductors, capacitors, and resistors. Other components 42 that may be mounted on board 38 or elsewhere in device 10 include switches, connectors, cameras, camera flash circuits (e.g., light-emitting diodes or other light sources that serve as a camera flash), and audio circuits. Components 42 may include video chips such as one or more display driver integrated circuits for displaying images on display 14 and a video driver integrated circuit or circuits for driving video signals onto a monitor or other external display that is coupled to device 10. Accessory interface circuitry such as circuitry that is associated with an external component that is controlled by device 10 and/or that provides input to device 10 and other circuits and devices may also be included in components 42 if desired.

During operation of device 10, components 42 and light emitting diodes 24 tend to generate heat. Device 10 can deduce the likely temperature of device 10 and its internal components such as light-emitting diodes 24 by monitoring the state of components 42. For example, if device 10 determines that a central processing unit (CPU) is active and is being clocked at or above its normal clock speed, a communications circuit is active and is conveying high-speed digital signals, and a video circuit is actively being used to display images on display 14 or an external monitor, device 10 can conclude that the temperature of light-emitting diodes 24 and other components associated with device 10 will likely be elevated during use and can take appropriate actions.

For example, device 10 can establish a maximum allowed light-emitting diode drive power value based on estimated temperature values that result from various combinations of component usage. Device 10 can generate the maximum allowed light-emitting diode power value by determining whether or not various components are active and/or by determining in real time how active each component is (i.e., by gathering component operating status information that indicates quantitatively in terms of an activity level how actively each component is being used). Activity level information may be gathered, for example, by ascertaining the clock rate of a processor, the amount of video signal data that is being generated by a video circuit, the bandwidth of data being conveyed by a communications circuit, or using other activity level metrics.

If desired, device 10 may include one or more temperature sensing circuits for monitoring the temperature of device 10 and internal circuits such as light-emitting diodes 24 and components 42. For example, one or more thermistors or other temperature sensors 44 may be mounted in device 10. In the example of FIG. 4, device 10 includes temperature sensors 44 (e.g., thermistors). One of sensors 44 is mounted on flex circuit 32 in the vicinity of light-emitting diodes 24 to accurately measure the temperature of light-emitting diodes 24. Another of sensors 44 (in the FIG. 4 example) is mounted on printed circuit board 38, where this sensor may measure the temperature of device 10 and (indirectly) the temperature of light-emitting diodes 24 and other components 40. There may, in general, be any suitable number of sensors 44 in device 10 (e.g., no sensors, one sensor, two sensors, three sensors, more than three sensors, fewer than three sensors, etc.).

Figure 5:
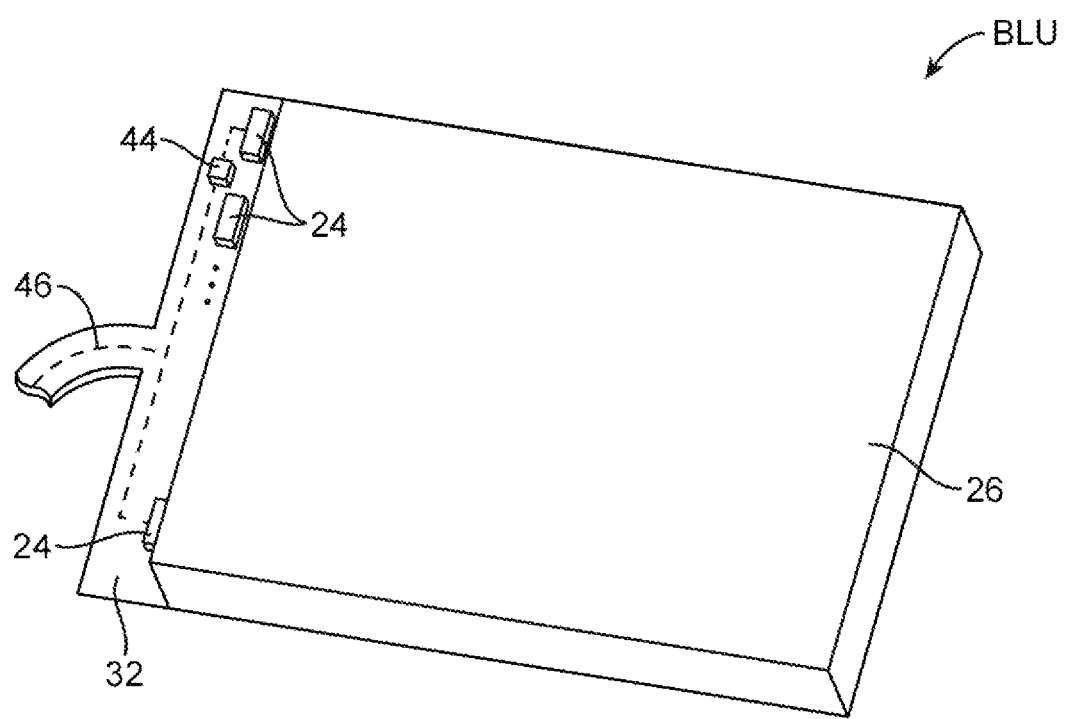
FIG. 5 is a perspective view of an illustrative backlight module that includes an array of light-emitting diodes and an associated light guide plate in accordance with an embodiment of the present invention.

FIG. 5 is a perspective view of the structures in backlight unit BLU, showing how temperature sensor 44 may, if desired, be mounted to the top surface of flex circuit substrate 32 (i.e., the same side of flex circuit substrate 32 to which light-emitting diodes 24 are mounted). Conductive traces 46 may be used to route drive power to light-emitting diodes 24 and may be used to gather temperature data from temperature sensor 44. If desired, temperature sensors such as temperature sensors 44 of FIGS. 4 and 5 may be mounted in other locations of device 10. The mounting arrangements of FIGS. 4 and 5 are merely illustrative.

The lifetime of light-emitting diodes 24 may be reduced when light-emitting diodes 24 are operated at elevated drive powers. Lifetime reductions may be exacerbated when light-emitting diodes 24 are operated at elevated temperatures (i.e., when the semiconductor p-n junctions the light-emitting diodes are operated at elevated temperature). To maximize the lifetime of light-emitting diodes 24 while allowing light-emitting diodes 24 to be overdriven if needed in particular situations, the operation of light-emitting diodes 24 (and, if desired, other components 42 in device 10) can be adjusted at least partly in response to the temperature of the light-emitting diodes. If it is determined that light-emitting diodes are at an elevated temperature, device 10 can take appropriate actions in controlling light-emitting diodes 24 and ensuring that excessive drive powers are not used.

When a higher than normal temperature is detected, device 10 (e.g., control circuitry associated with a processor or other components 42) can forgo all use of light-emitting diode drive powers above a normal operating limit, can allow light-emitting diodes 24 to be briefly operated at drive powers above a normal threshold, but only for a limited amount of time, or can require use a lower light-emitting diode drive power than would normally be used. Device 10 may, for example, establish a maximum drive power value based on the current temperature. The maximum drive power value at temperatures above room temperature can be lower, for example, than the maximum drive power level at temperatures at or below room temperature. Device 10 can also reduce the activity level of other components 42 to help reduce the temperature of light-emitting diodes 24 during operation (either in conjunction with adjustments to the drive powers of the light-emitting diodes or independently) and/or can notify the user of the elevated temperature and any associated response by device 10.

By controlling device 10 in this way, the lifetime of light-emitting diodes 24 can be extended or can at least not be degraded as they otherwise might be. Device 10 can use an open-loop control scheme in controlling light-emitting diodes 24, can use a closed-loop control scheme in controlling light-emitting diodes 24, or may use a combination of open-loop and closed-loop control techniques in controlling light-emitting diodes 24.

In an open-loop control scheme, the temperature of light-emitting diodes 24 can be ascertained by monitoring the status of device components. By determining which components in device 10 are active and, if desired, by determining how active these components are, the resulting impact on the temperature of light-emitting diodes 24 can be estimated. As an example, if device 10 determines that a processor (e.g., a CPU) in device 10 is being used at a particular clock speed, device 10 can estimate how much the temperature of light-emitting diodes 24 is being elevated by the processor's activity. As another example, if device 10 determines that a video circuit is being used to drive a display, device 10 can estimate how much the temperature of light-emitting diodes 24 will be elevated by the use of the video circuit. Combinations of component usage can also be detected and their impact on light-emitting diode operating temperature estimated. If, for example, a CPU, video chip, accessory communications bus, and camera flash are all being used, device 10 can aggregate the separate impacts of using each of these components to produce an overall temperature increase estimate for light-emitting diodes 24.

In a closed loop control scheme, temperature sensor equipment 44 may be used to make temperature measurements that directly or indirectly relate to the temperature of light-emitting diodes 24. Temperature measurement feedback of this type may be used separately or in combination with open-loop control information such as component usage information to determine the temperature of light-emitting diodes 24. For example, control circuitry in device 10 may process raw signals from a thermistor or other temperature sensor to gather feedback on the actual temperature of light-emitting diodes 24 in real time.

When elevated light-emitting diode temperatures are detected (directly and/or by inference when it is determined that heat-producing activities are occurring in the components in device 10), the drive power of the light-emitting diodes can be adjusted or other suitable actions may be taken.

Figure 6:
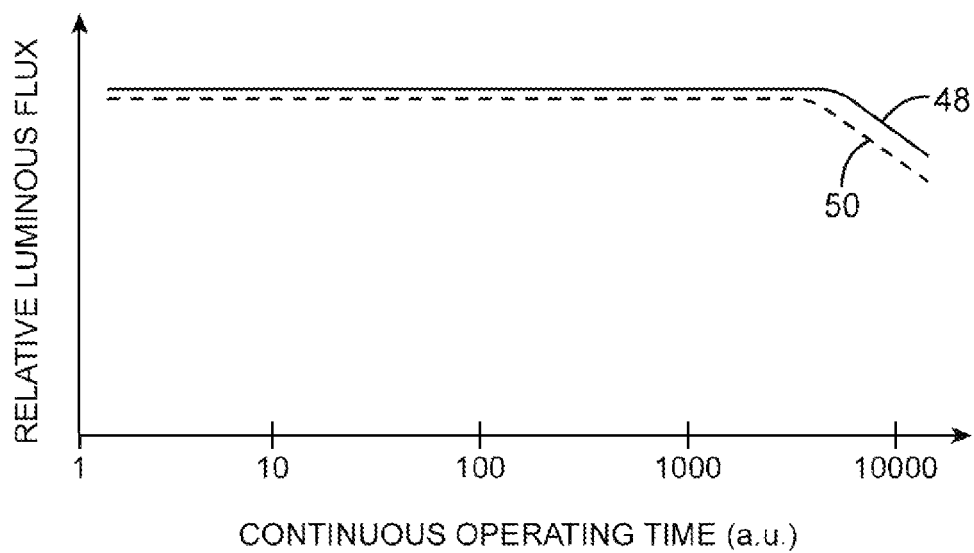
FIG. 6 is a graph showing how light-emitting diode light output may degrade as a function of time at room temperature for two different drive powers in accordance with an embodiment of the present invention.

FIG. 6 is a graph showing how the lifetime of a typical light-emitting diode is affected by drive power at room temperature (25° C.). The graph shows measured light-output as a function of operating time. As shown in FIG. 6, when driven at a first drive power (curve 48), the light output from the light-emitting diode may drop after a larger number of operating hours (lifetime) than when driven at an elevated (overdrive) drive power such as a second power that is greater than the first power (curve 50).

Figure 7:
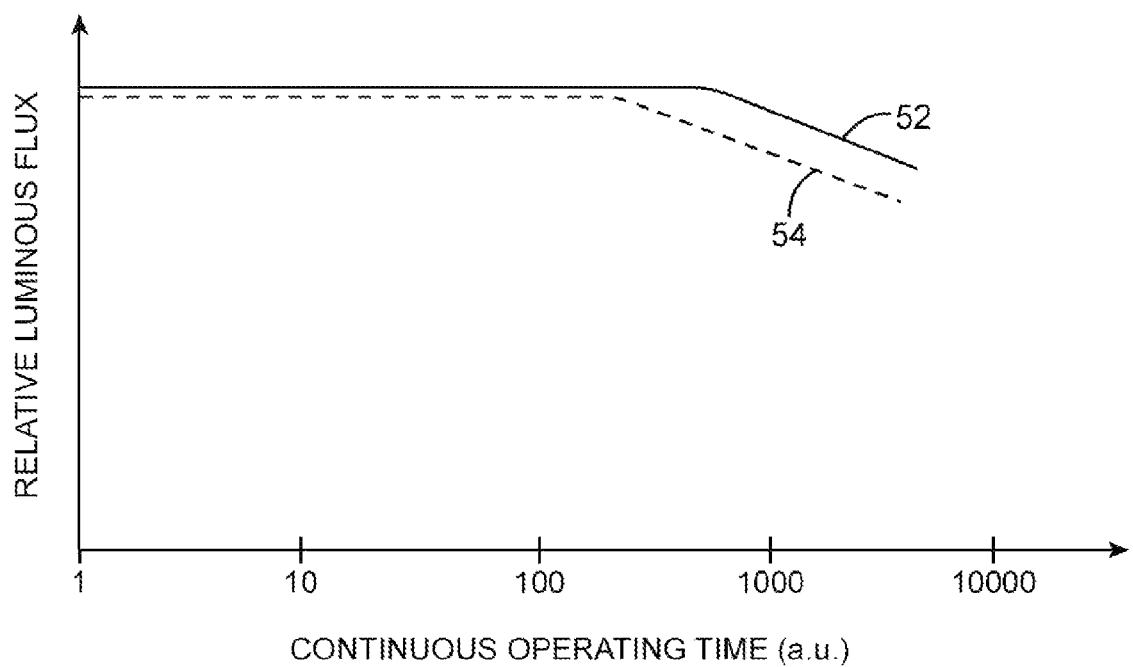
FIG. 7 is a graph showing how light-emitting diode light output may degrade as a function of time at an elevated temperature for the two different drive powers of FIG. 6 in accordance with an embodiment of the present invention.

FIG. 7 is a graph showing how the lifetime of a typical light-emitting diode is affected by operation at elevated temperatures. In the FIG. 7 example, light-emitting diode output has been plotted as a function of operating time for two different drive powers at an operating temperature of 60° C. Curve 52 corresponds to operation at the first drive power of FIG. 6. Curve 54 corresponds to operation at the second drive power of FIG. 6 (i.e., the elevated drive power). As shown by comparing curves 52 and 54 to curves 48 and 50 of FIG. 6, the elevation of the operating temperature of the light-emitting diode from 25° C. to 60° C. can significantly shorten operating lifetime, whether or not the diode is operated at an elevated drive power. Both curve 52 (corresponding to operation at the lower drive power) and curve 54 (corresponding to operation at the elevated drive power) exhibit light output fall off significantly earlier than even the elevated drive power characteristic of FIG. 6 (e.g., curve 50 of FIG. 6, corresponding to operation at the elevated drive power at room temperature). Moreover, as shown by comparing curves 54 and 52, the reduction in lifetime that results from operating the light-emitting diode at elevated drive powers is significantly greater when operating at 60° C. than 25° C.

Figure 8:
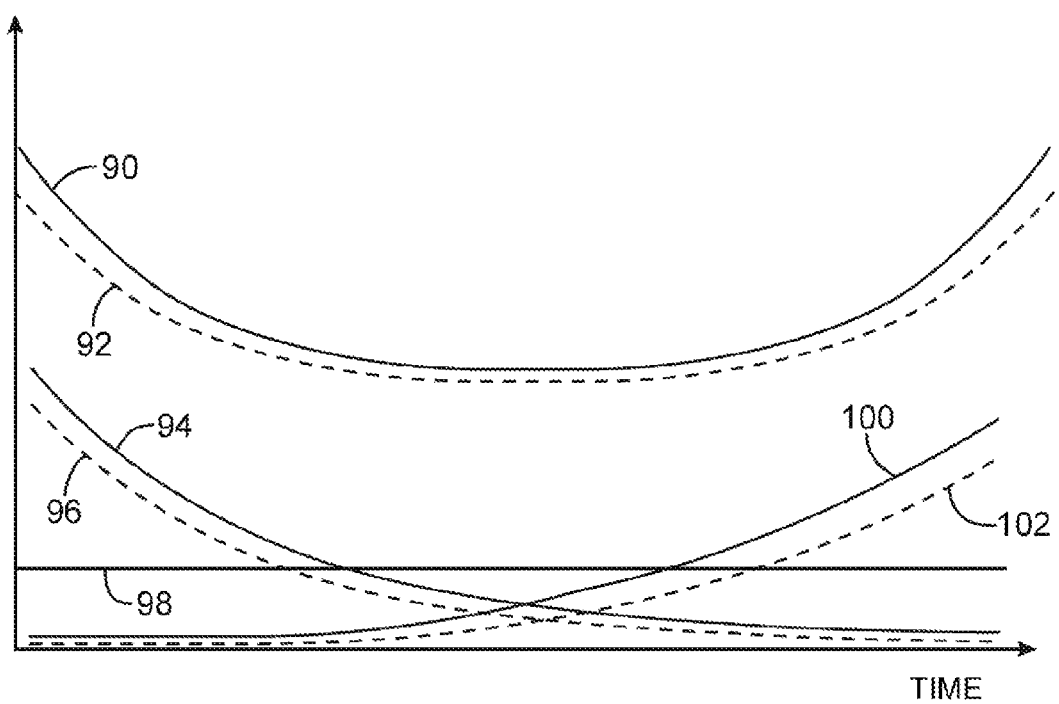
FIG. 8 is a graph showing how light source failure rates may be reduced by avoiding simultaneous operation at elevated temperatures and drive power in accordance with an embodiment of the present invention.

The failure rate of display light sources such as light-emitting diodes and fluorescent lights may be characterized as a function of time by a curve such as curve 90 of FIG. 8. Curve 90 represents the total failure rate of the light sources as a function of time and is influenced by separate contributions from infant mortality (curve 94), random failures (curve 98), and wear out failure (cure 100). Curve 90 represents the sum of curves 94, 98, and 100 and corresponds to the failure rate of light sources that are sometimes operated simultaneously at elevated temperatures and drive powers. By avoiding the use of simultaneous elevated temperatures and drive powers (i.e., by limiting drive powers when elevated temperatures are present), infant mortality can be reduced (curve 96) and wear out failures can be reduced (curve 102), leading to a reduced total failure rate curve such as curve 92.

As the curves of FIGS. 6, 7, and 8 demonstrate, operation at elevated temperatures makes light-emitting diodes (and other light sources such as fluorescent lights) sensitive to drive power levels, so use of overdrive powers for light-emitting diodes in a backlight (e.g., to compensate for weak transmittance in module 22 due to inclusion of structures in module 22 that have a high color gamut) can have a non-negligible impact on diode lifetime if care is not taken to reduce operating temperature or limit the amount of time during which elevated drive powers and elevated operating temperatures are in simultaneous use.

In an open-loop control scheme, device 10 may monitor the status of components in device 10 and can take appropriate actions to ensure that use of an elevated (high) drive power (e.g., the second drive power in the example of FIGS. 6 and 7) is not used or is only used for a limited amount of time when the temperature of device 10 and light-emitting diodes 24 is expected to be elevated. With one suitable arrangement, control circuitry in device 10 (e.g., control circuitry in components 42 of FIG. 4 such as a processor and associated power source for supplying a desired adjustable drive power to light-emitting diodes 24) can be used to determine the state of components such as a processor (CPU), a video driver circuit (VIDEO), a camera flash or other image illumination source (CAMERA STROBE), communications integrated circuits for communicating internally or communicating with accessories such as attached audio/video accessories (ACCESSORIES), and can be used to adjust the drive power for light-emitting diodes 24 (DISPLAY BACKLIGHT) accordingly.

As shown in row 56 of the table of FIG. 9, for example, if the processor, video driver, camera strobe, and accessory circuits are determined to be inactive or operating at low levels (L), device 10 may conclude that the operating temperature for the light-emitting diodes will be relatively modest (e.g., at or close to room temperature, even when the light-emitting diodes are overdriven). Device 10 may therefore set a maximum drive power value for diodes 24 at a high (H) level to allow the light-emitting diodes to be driven at any desired power level up to and including desired overdrive power levels (e.g., the first drive power or the second drive power in the example of FIGS. 6 and 7).

As shown in row 58 of FIG. 9, if some of the components of device 10 such as the camera strobe and accessories circuits are fully active (H), device 10 can conclude that the light-emitting diodes will be operating at a slightly elevated temperature (e.g., 40° C.). Based on this estimated operating temperature, device 10 can drive light-emitting diodes 24 at a somewhat reduced drive power level (e.g., a medium level M that lies between the first and second drive powers of FIGS. 6 and 7).

As shown in row 60 of the table of FIG. 9, when many components are active in device 10 (e.g., when the processor is operating at a normal or elevated clock speed, when the video circuit is actively supplying video signals for a display, when communications circuitry is being used to convey signals at a rate that is sufficient to cause the temperature of the communications circuit to rise significantly above room temperature, or when other components are being used enough to produce heat), device 10 can conclude that the temperature of light-emitting diodes 24 in backlight unit BLU of display 14 has become elevated (e.g., to a temperature of 60° C. or to other estimated temperature levels as determined through testing and characterization operations). In this situation, the potentially lifetime-reducing operation of light-emitting diodes 24 at overdrive power levels at the elevated temperature of 60° C. can be avoided by capping the maximum permitted overdrive power for light-emitting diodes 24 at a relatively low level (L) such as the first drive power value of FIGS. 6 and 7.

When using an open-loop control scheme of the type shown in FIG. 9, the values of the entries in the table of FIG. 9 (e.g., the column of desired values for light-emitting diode maximum power in backlight structures BLU) can be determined in advance by characterizing one or more test devices (or evaluation boards) prior to constructing production devices. For example, a tester or test software loaded into device 10 may be used to systematically activate the different patterns of components that are shown in the various rows of FIG. 9 and can use a temperature sensor or other measurement arrangement to monitor the resulting temperature of light-emitting diodes 24 and surrounding portions of device 10.

Once the operating temperature of device 10 in the vicinity of light-emitting diodes 24 has been measured in response to various combinations of component usage, the tester or other computing equipment can generate appropriate settings for light-emitting diodes 24 (e.g., the right-hand column entries of the table of FIG. 9) that avoid the simultaneous operation of the light-emitting diodes at overdrive power levels and elevated temperatures or that at least ensure that the maximum drive power levels that are used for the light-emitting diodes (i.e., the maximum levels that bound the allowed range of drive powers that are in use at any given point in time) are lower when more components or hotter component are active (and the expected operating temperature is higher) than when fewer components or cooler components are active (and the expected operating temperature is lower).

When using a closed-loop control scheme, device 10 can measure the temperature of light-emitting diodes 24 in real time using temperature sensors such as temperature sensors 44 of FIGS. 4 and 5. The amount of power that is used in driving the light-emitting diodes can be reduced as a function of increased temperature, as shown by curve 62 of FIG. 10. In the FIG. 10 example, the reduction in maximum allowed drive power that is imposed by device 10 changes continuously, so that the maximum allowed drive power value that is used decreases as a function of increasing measured temperature. If desired, a binary scheme or other stepped scheme may be used in which the maximum allowed drive power has only two values (or other integer number of values) and in which device 10 determines which of the allowed discrete drive power values to use based on the measured temperature.

If desired, a combination of open-loop and closed-loop control schemes may be used. For example, open-loop control may be used to impose an initial maximum allowed drive power value for driving light-emitting diodes 24 and feedback from temperature sensor equipment in device 10 may be used in refining the maximum allowed drive power to a more accurate value in real time.

Figure 11:
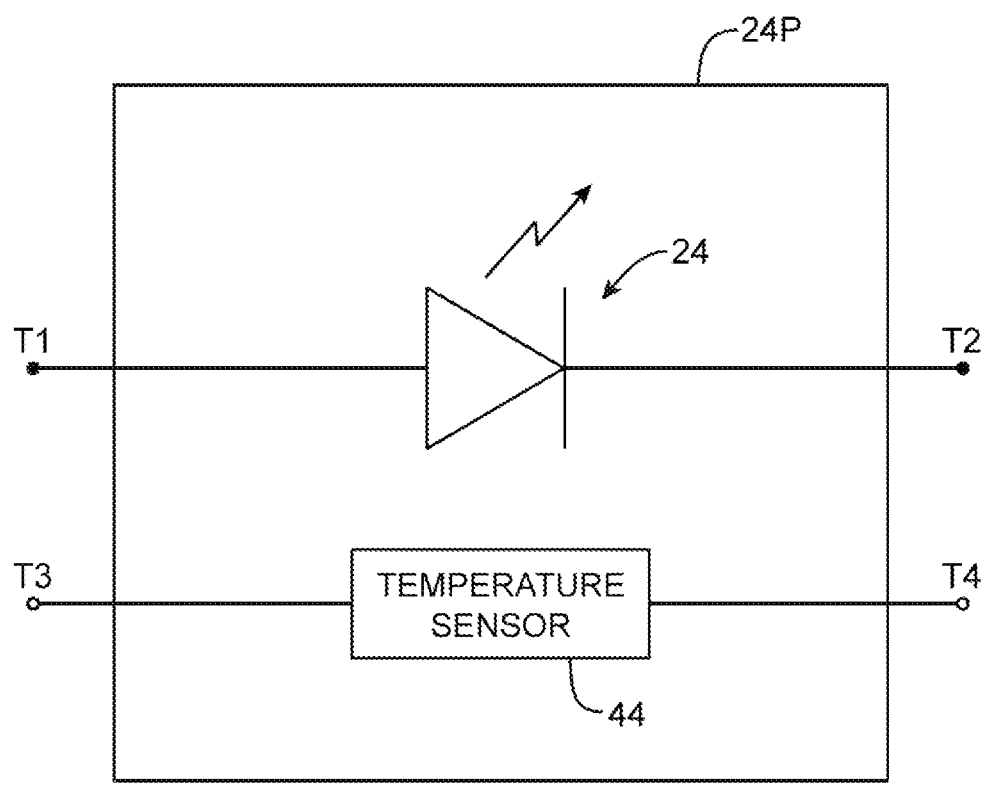
FIG. 11 is a diagram of a light-emitting diode package that includes a light-emitting diode device and an integral temperature sensor in accordance with an embodiment of the present invention.

Temperature sensors such as temperature sensors 44 of FIGS. 4 and 5 may, if desired, by mounted in the same package as a light-emitting diode. An example of this type of arrangement is shown in FIG. 11. As shown in FIG. 11, light-emitting diode 24 and temperature sensor 44 may be mounted within package 24P. Package 24P may be, for example, a surface mount technology (SMT) package or other semiconductor device package. Temperature sensor 44 of FIG. 11 may be, for example, a thermistor. Terminals such as terminals T1 and T2 may be used to power light-emitting diode 24 and terminals such a terminals T3 and T4 may be used to gather temperature sensor data from sensor 44.

If desired, temperature information can be gathered by monitoring diode 24 (e.g., to detect the forward voltage across the diode for a given value of applied drive power). The forward voltage across diode 24 decreases as a function of operating temperature for a given drive power, so by characterizing diode 24 and storing corresponding calibration information in control circuitry in device 10, the control circuitry can determine the current operating temperature of diode 24 by monitoring its operating status (e.g., operating current and voltage).

Figure 12:
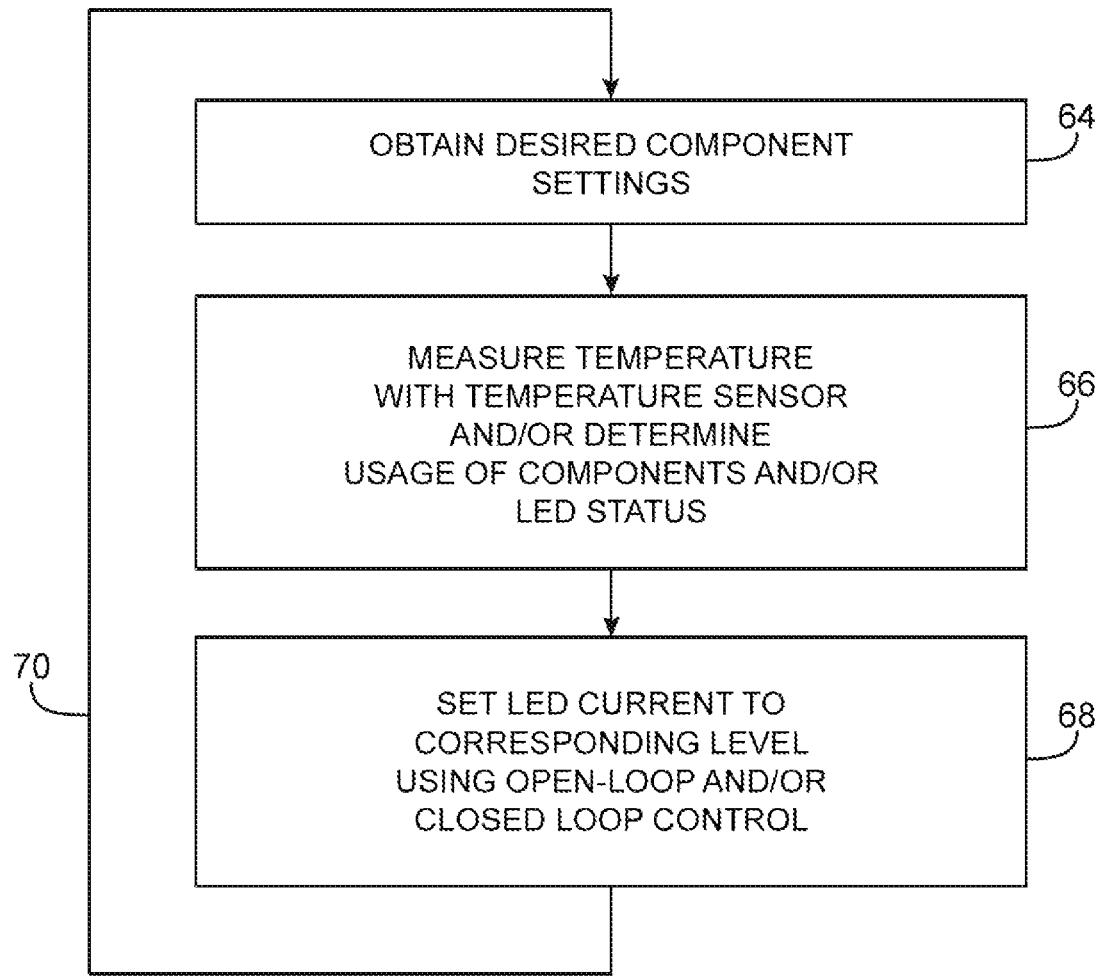
FIG. 12 is a flow chart showing how light-emitting diodes may be operated at drive power levels that are selected based on factors such as how much heat is being produced by internal device components and feedback from temperature sensor equipment in accordance with an embodiment of the present invention.

A flow chart of illustrative steps involved in operating device 10 of FIG. 1 and in controlling light-emitting diodes 24 is shown in FIG. 12.

At step 64, control circuitry in device 10 may obtain information on the desired operating settings for components in device 10 such as components 42 and light-emitting diodes 24. For example, device 10 may obtain settings establishing a desired display brightness, may obtain settings establishing a desired usage level for a processor, may obtain settings establishing a desired usage for a video driver circuit, may obtain settings establishing usage (on/off, etc.) for a camera flash and other accessories, may obtain settings establishing usage for communications circuits and other heat-producing circuits, etc. These settings may be based on user input, sensor input (e.g., from an ambient light sensor, etc.) and/or software-generated information.

At step 66, device 10 may determine the operating status of components in device 10 such as light-emitting diodes 24 and components 42. For example, device 10 may determine what clock rate is being used for operating a processor or may determine how many cores a processor is using, device 10 may determine whether or not a video driver circuit is being used and how actively the video driver circuit is being used, device 10 may determine whether a camera flash or other light source is being used, device 10 may determine whether heat-producing communications circuits or other heat-producing circuitry is being used, etc. Device 10 may also measure the temperature of light-emitting diodes 24 using one or more thermistors 44 or other temperature sensors. The temperature of light-emitting diodes 24 may be influenced by factors such as whether the light-emitting diodes and other components in device 10 are being used and the temperature of device 10. The temperature of device 10 may be affected by internal component usage levels, light-emitting diode usage levels, the temperature of the environment in which device 10 is operating (e.g., an elevated ambient temperature), etc.

The temperature sensors may be located on a substrate such as a flex circuit that contains light-emitting diodes 24, may be located on a printed circuit board substrate that contains processors and other circuit components, etc. If desired, one or more temperature sensors may be located within the same semiconductor device package (e.g., an SMT package) as one or more light-emitting diodes. If desired, the thermal characteristics of structures that are interposed between the temperature sensor and the light-emitting diodes (e.g., the thermal resistance of the package used for the light-emitting diodes) may be taken into account when calibrating the temperature sensors (e.g., to improve the accuracy of the temperature estimates that are made when measuring temperature with the temperature sensor). Light-emitting diode operating temperature may also be measured by using the control circuitry of device 10 to measure the drive current and forward voltage of light-emitting diodes 24 and by using known calibration data to ascertain temperature from this measured diode operating current and operating voltage data.

Figure 10:
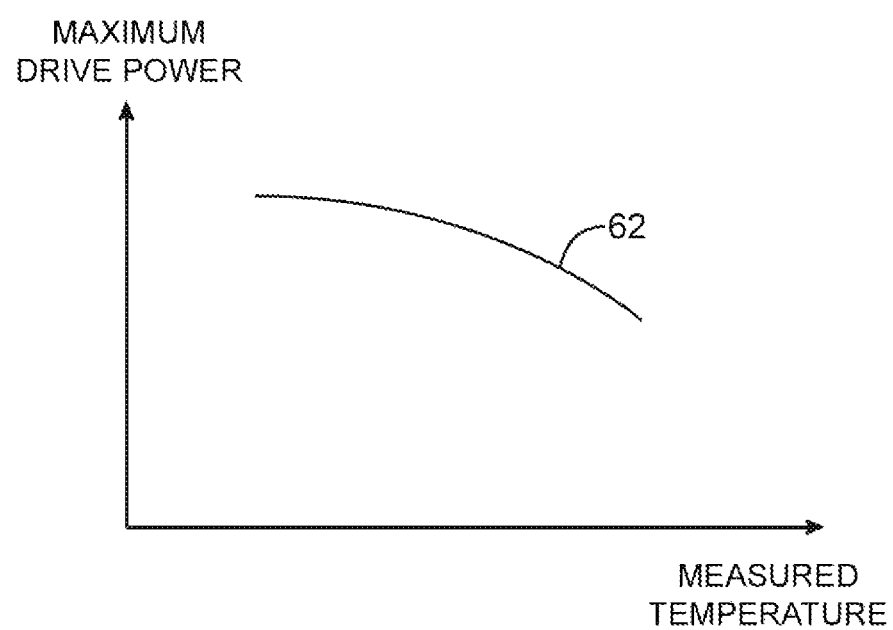
FIG. 10 is a graph showing how control circuitry in an electronic device may reduce a maximum allowed light-emitting diode drive power level as a function of measured temperature in accordance with an embodiment of the present invention.

During the operations of step 68, device 10 may use open-loop control schemes of the type described in connection with FIG. 9 and/or closed-loop control schemes of the type described in connection with FIG. 10 to determine the operating temperature of light-emitting diodes 24 and to take appropriate action. In a typical arrangement, actions that may be taken by device 10 include limiting the maximum drive power that can be used in powering light-emitting diodes 24 to a value that is reduced in accordance with the temperature (as measured or estimated from component status), turning off (deactivating) or reducing the amount of usage of one or more components to reduce the temperature that is experienced by the light-emitting diodes, limiting the amount of time that light-emitting diodes 24 are operated at elevated temperatures and drive powers simultaneously, combinations of these actions, and other suitable actions.

An example of another suitable action that may be taken by device 10 is issuing an alert. For example, device 10 may display an interactive on-screen notification to a user. The on-screen notification may inform the user that brightness of display 14 is to be reduced. The notification may ask the user to confirm or override the decision of device 10 to reduce the display brightness or may contain other options for the user. For example, the notification may ask the user whether the user wishes to view similar alerts in the future. The notification may inform the user that the display brightness is being reduced due to an elevated temperature and may suggest to the user that the user reduce the temperature of device 10 by reducing the use of device features and/or moving device 10 to a cooler location. If desired, device 10 may present a thermal overload warning to a user whenever the temperature of device 10 becomes elevated during operation. The overload warning screen may include options such as options to reduce processor clock speed, options to cancel secondary services, options to terminate applications, options to reduce screen brightness, and other options that relate to reducing the production of heat within device 10.

As indicated by line 70, once device 10 has adjusted the operation of light-emitting diodes 24 and other components 42 in device 10, control may loop back to the operations of step 64 (e.g., to obtain updated information on the desired operating state of device 10).

Displays with backlights that contain light sources such as fluorescent lamps may be adversely affected by extended operation at elevated brightness levels and elevated temperatures. Fluorescent lamp performance degradation may result from a reduction in available mercury, poisoning of the cathode, and phosphor degradation, effects that are generally accelerated by elevated temperature. To avoid undesired display degradation, device 10 can reduce the brightness of the fluorescent lamp in the backlight and/or can take other appropriate actions, such as reducing the activity level of other device components to reduce internal heat production when conditions warrant. For example, device 10 can reduce the brightness of the fluorescent lamp in situations in which the temperature of device 10 is elevated (e.g., due to ambient conditions, use of components in device 10, etc.) and/or device 10 can reduce the activity level of internal components (e.g., components within device 10 can be turned off or operated at reduced activity levels to reduce the production of heat).

Figure 13:
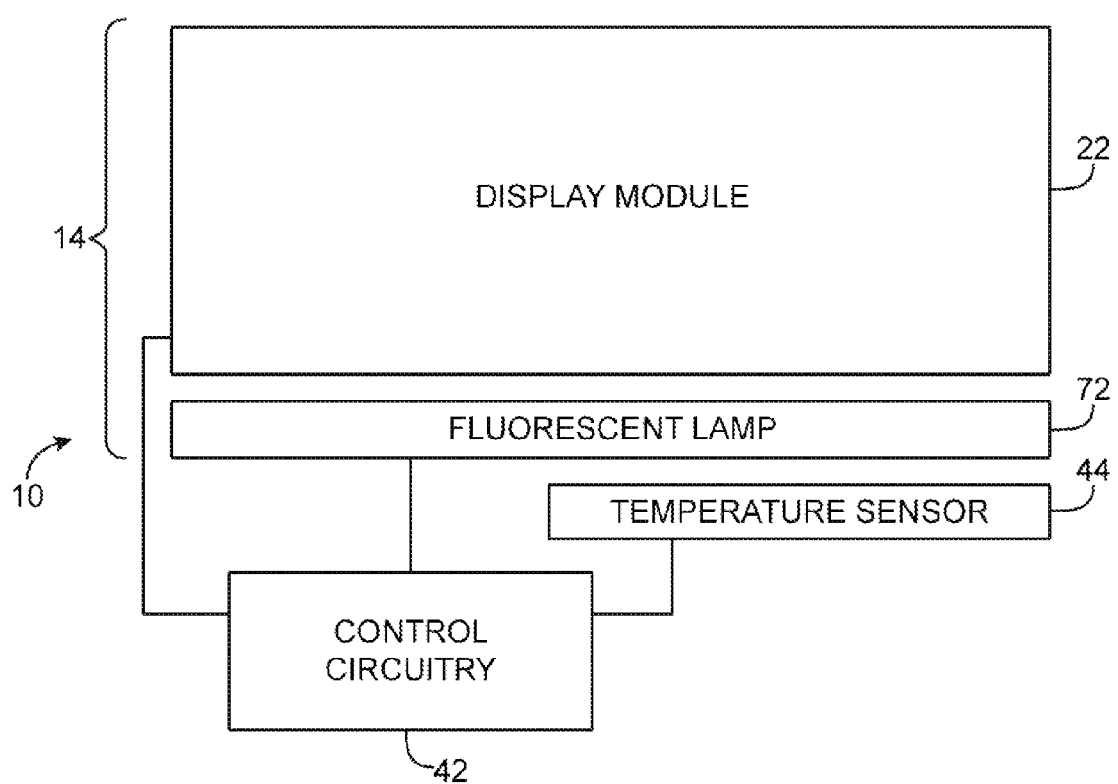
FIG. 13 is a diagram of an electronic device in which a fluorescent lamp in a display backlight and other components are controlled to ensure that the display lifetime in not undesirably shortened due to operation at elevated temperatures in accordance with an embodiment of the present invention.

A diagram of an electronic device in which a fluorescent lamp is used in a display backlight is shown in FIG. 13. As shown in FIG. 13, display 14 of device 10 may contain a display module such as module 22 (e.g., a liquid crystal display module). Backlight for display module 22 may be provided by fluorescent lamp 72. Control circuitry 42 may include processors and other circuitry for controlling the operation of device 10 and may contain components that have the potential to generate heat when operated (e.g., processors, video circuits, camera flash units, communications circuits, etc.). During operation, control circuitry 42 can monitor the temperature of device 10 and display 14 using one or more temperature sensors 44 and/or control circuitry 42 can infer the current temperature of device 10 and display 14 by monitoring the activity levels of device components. Based on information on the current temperature of device 10 and display 14, control circuitry 42 can take appropriate actions such as reducing the drive power strength for fluorescent lamp 72 and/or reducing the activity level for other device components.

Figure 14:
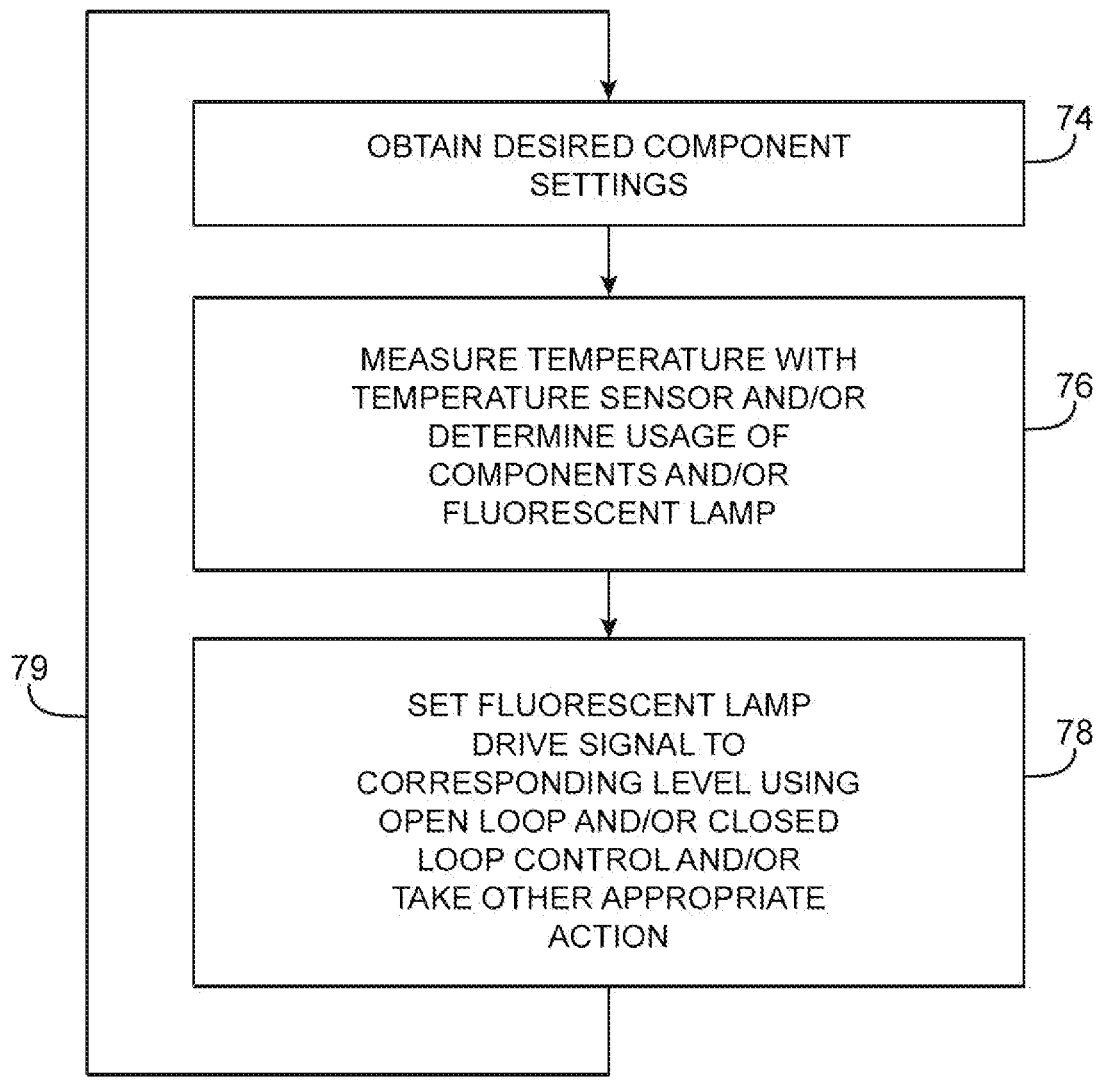
FIG. 14 is a flow chart showing how the fluorescent lamp of FIG. 13 may be operated at drive power levels that are selected based on factors such as how much heat is being produced by internal device components and feedback from temperature sensor equipment in accordance with an embodiment of the present invention.

FIG. 14 is a flow chart of illustrative steps involved in using control circuitry 42 to operate device 10 of FIG. 13.

At step 74, control circuitry 42 may obtain information on the desired operating settings for components in device 10. For example, device 10 may use control circuitry 42 to obtain settings establishing a desired display brightness, a desired usage level for a processor, a desired usage for a video driver circuit, desired camera flash usage, desired usage for communications circuits, and desired usage for other heat-producing components in circuitry 42. These settings may be based on user input, sensor input (e.g., from an ambient light sensor, etc.) and/or software-generated information.

At step 76, device 10 may determine the operating status of components in device 10. For example, device 10 may use control circuitry 42 to determine what clock rate is being used for operating a processor or may determine how many cores a processor is using, to determine whether or not a video driver circuit is being used and how actively the video driver circuit is being used, to determine whether a camera flash or other light source is being used, to determine whether heat-producing communications circuits or other heat-producing circuitry is being used, etc. Device 10 may also use control circuitry 42 to measure the temperature of device 10 and display 14 (e.g., the temperature of fluorescent lamp 72) using one or more thermistors 44 or other temperature sensors. The temperature of fluorescent lamp 72 may be influenced by factors such as whether fluorescent lamp 72 and other components in device 10 are being used and the temperature of device 10. In general, the temperature of device 10 may be affected by factors such as internal component usage levels, fluorescent lamp usage levels, the temperature of the environment in which device 10 is operating (e.g., an elevated ambient temperature), etc.

The temperature sensors such as sensor 44 of FIG. 13 may be located on or adjacent to fluorescent lamp 72, may be located on a printed circuit board substrate that contains processors and other circuit components, etc. The operating temperature of fluorescent lamp 72 may also be ascertained by using the control circuitry of device 10 to determine how strongly fluorescent lamp 72 is being driven.

During the operations of step 78, device 10 may use open-loop control schemes and/or closed-loop control schemes to determine the operating temperature of fluorescent lamp 72 and can take appropriate action. In a typical arrangement, actions that may be taken by device 10 include limiting the maximum drive power strength that can be used in powering fluorescent lamp 72 to a value that is reduced in accordance with the temperature (as measured or estimated from component status), turning off (deactivating) or reducing the amount of usage of one or more device components to reduce the temperature that is experienced by fluorescent lamp 72, limiting the amount of time that fluorescent lamp 72 is simultaneously operated at elevated temperatures and elevated drive power strengths, issuing alerts, combinations of these actions, and taking other suitable actions.

As indicated by line 79, once device 10 has adjusted the operation of fluorescent lamp 72 and other components 42 in device 10, control may loop back to the operations of step 74 (e.g., to obtain updated information on the desired operating state of device 10).

In displays such as organic light-emitting diode displays, each image pixel in the array is independently controlled and produces illumination without use of a separate backlight unit. To avoid performance degradation issues such as reduced brightness and color shifts, care should be taken to avoid excessive operation of a display of this type at simultaneous elevated brightness levels and elevated temperatures. For example, when temperatures are elevated, the maximum pixel brightness for each pixel may be limited and/or other device components can be operated at reduced activity levels to help reduce display temperature.

Figure 15:
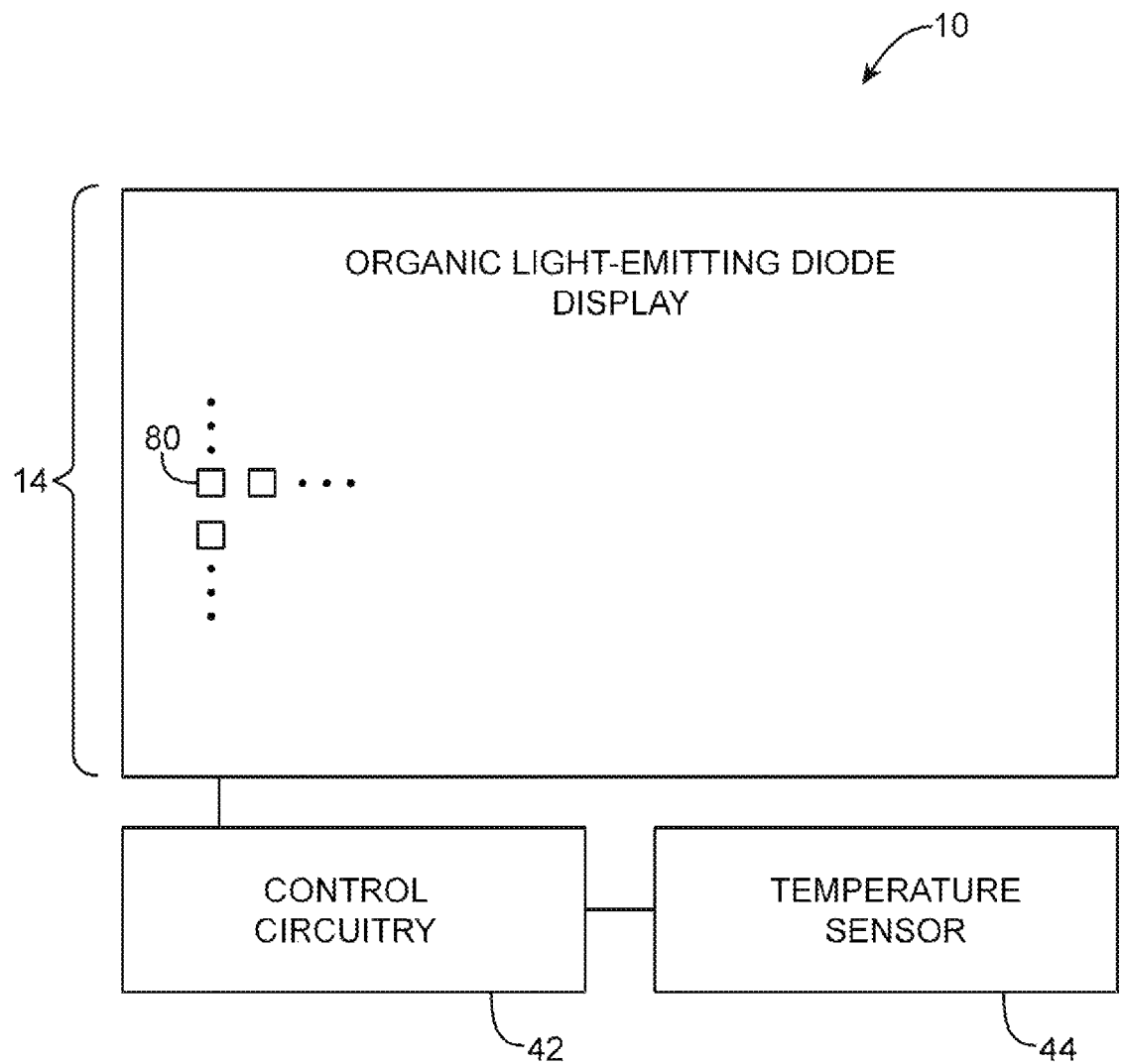
FIG. 15 is a diagram of an electronic device in which the brightness level of a display such as an organic light-emitting diode display and the activity level of other components are controlled to ensure that the display lifetime in not undesirably shortened due to operation at elevated temperatures in accordance with an embodiment of the present invention.

As shown in FIG. 15, organic light-emitting diode display 14 may have an array of individual light-producing image pixels 80. During operation of display 14 the pixels 80 can be controlled to produce images on display 14. The brightness of display 14 can be controlled by controlling how strongly each individual pixel is driven. When pixels 80 are allowed to emit their maximum light levels, display 14 will have its maximum brightness. When the light emission from pixels 80 is limited by control circuitry 42, the overall brightness of display 14 will be reduced.

Temperature sensor 44 (e.g., one or more thermistors or other temperature sensors) may be used in measuring the temperature of display 14 of FIG. 15. The current operating temperature of display 14 can also be ascertained by determining the activity level of components in device 10 (e.g., processors, video circuits, camera flash units, communications circuits, and other components within circuitry 42 of FIG. 15).

Figure 16:
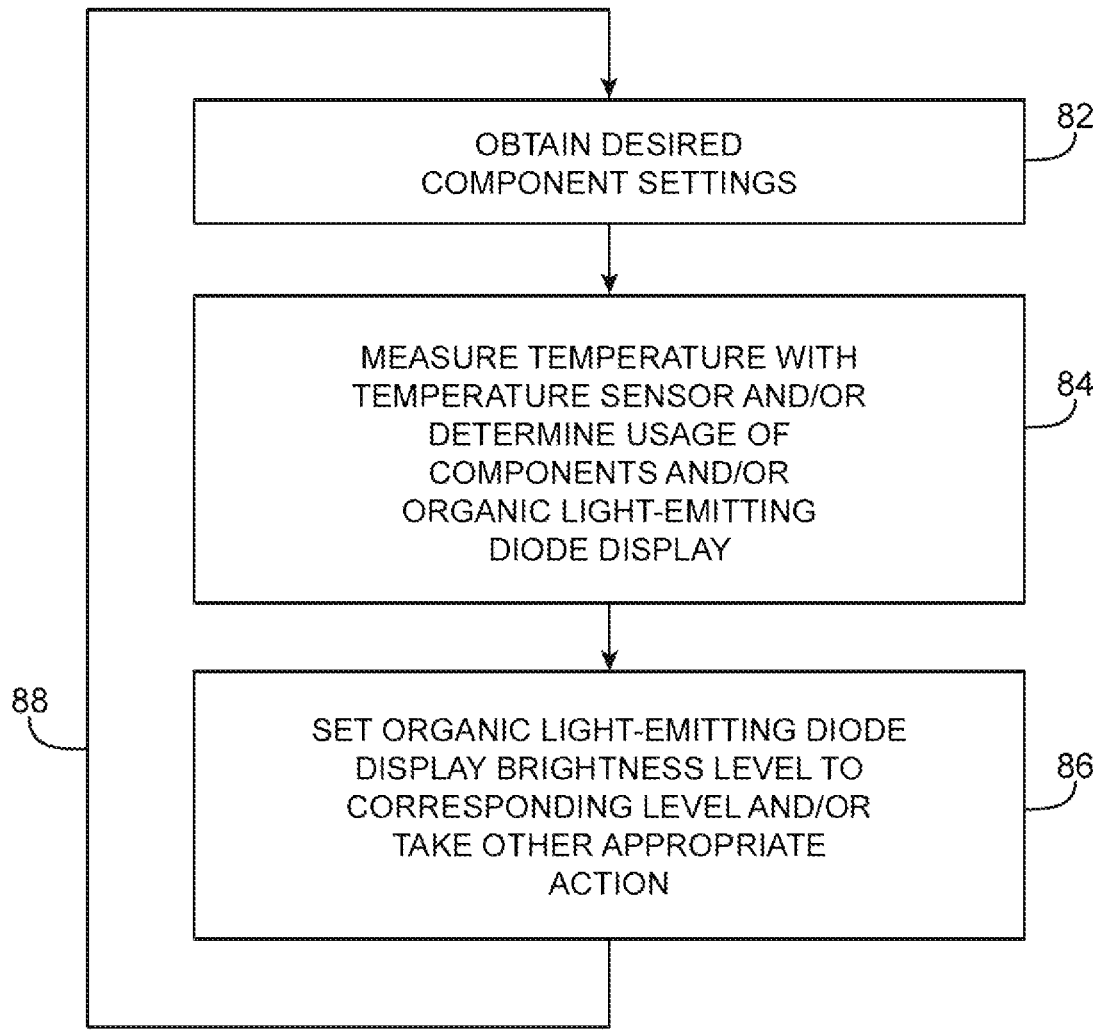
FIG. 16 is a flow chart showing how the display of FIG. 15 may be operated at drive power levels that are selected based on factors such as how much heat is being produced by internal device components and feedback from temperature sensor equipment in accordance with an embodiment of the present invention.

Illustrative steps involved in operating device 10 of FIG. 15 to ensure that the performance of display 14 is not undesirably degraded from operation at elevated temperature and high brightness levels is shown in FIG. 16.

At step 82, device 10 may use control circuitry 42 to obtain settings establishing a desired display brightness, a desired usage level for a processor, a desired usage for a video driver circuit, desired camera flash usage, desired usage for communications circuits, and desired usage for other heat-producing components in circuitry 42 and may otherwise obtain information on the desired operating settings for components in device 10. These settings may be based on user input, sensor input (e.g., from an ambient light sensor, etc.) and/or software-generated information.

At step 84, device 10 may determine the operating status of components in device 10. Control circuitry 42 may, for example, gather information on processor clock rates, information on how many cores a processor is using, information on whether or not a video driver circuit is being used and how actively the video driver circuit is being used, information on whether a camera flash or other light source is being used, information on whether heat-producing communications circuits or other heat-producing circuitry is being used, etc. Device 10 may also use control circuitry 42 to measure the temperature of device 10 and display 14 using one or more thermistors 44 or other temperature sensors. The temperature of display 14 may be influenced by factors such as whether display 14 and other components in device 10 are being used and the ambient temperature for device 10. By determining the activity of a video driver circuit, processor, and other components, device 10 can estimate the operating temperature of display 14. To measure temperature directly using temperature sensor 44 of FIG. 15, sensor 44 may be located on or adjacent to display 14 or may be located elsewhere in device (e.g., on a printed circuit board, etc.).

During the operations of step 86, device 10 may use open-loop control schemes (e.g., temperature estimates based on component activity levels) and/or closed-loop control schemes (e.g., control schemes using temperature feedback from temperature sensor 44) to determine the operating temperature of display 14 and can take appropriate action. Actions that may be taken by device 10 include limiting the maximum drive power strength that can be used in powering each of pixels 80 of display 14 to a value that is reduced in accordance with the temperature (as measured or estimated from component status), turning off (deactivating) or reducing the amount of usage of one or more device components to reduce the temperature that is experienced by display 14, limiting the amount of time that display 14 is simultaneously operated at elevated temperatures and elevated pixel drive power strengths, issuing alerts, taking other suitable actions, and combinations of these actions.

As indicated by line 88, once device 10 has adjusted the operation of display 14 and other components 42 in device 10, control may loop back to the operations of step 82 (e.g., to obtain updated information on the desired operating state of device 10).

The foregoing is merely illustrative of the principles of this invention and various modifications can be made by those skilled in the art without departing from the scope and spirit of the invention.

What is claimed is:

1. A method of operating an electronic device with a display and at least one component selected from the group consisting of: a processor, a video driver circuit, a camera flash, and a communications circuit, comprising:
   determining a current activity level of the at least one component;
   estimating a current temperature based on the current activity level of the at least one component;
   during operation of the electronic device, powering each light source that illuminates the display at a level that is based at least partly on the estimated current temperature, wherein each light source comprises a light-emitting diode, wherein powering each light source comprises applying a drive power to each light-emitting diode that has a value that is bounded by a maximum light-emitting diode drive power value, and wherein the maximum light-emitting diode drive power value is determined based at least partly on the estimated current temperature; and
   adjusting the drive power to each light-emitting diode while operating the light-emitting diode at a non-zero drive power value below the maximum light-emitting diode drive power value.

2. The method defined in claim 1 further comprising:
   measuring temperature with a temperature sensor in the electronic device, wherein powering each light source comprises powering each light source based at least partly on the measured temperature.

3. The method defined in claim 2 the temperature sensor and at least one of the light-emitting diodes are mounted within a common semiconductor package, wherein the common semiconductor package is mounted on a substrate, and wherein measuring the temperature comprises measuring the temperature using the temperature sensor mounted within the common semiconductor package.

4. The method defined in claim 2 wherein the display comprises a flex circuit, wherein each light-emitting diode is mounted on the flex circuit, and wherein measuring the temperature comprises measuring the temperature using the temperature sensor on the flex circuit.

5. The method defined in claim 1 further comprising:
   measuring the current temperature using a temperature sensor and using control circuitry within the electronic device to adjust the maximum light-emitting diode drive power value in real time during operation of the electronic device based at least partly on the measured temperature.

6. A method of operating an electronic device that has a display, light-emitting diodes that produce backlight for the display, and components including a processor and a video circuit, the method comprising:
   with control circuitry in the electronic device, obtaining operating status information for at least a selected one of the processor and the video circuit, wherein the operating status information indicates a current activity level of the at least a selected one of the processor and the video circuit;
   with the control circuitry in the electronic device, applying a drive power to the light-emitting diodes that has a value that is bounded by a maximum light-emitting diode drive power value, wherein the maximum light-emitting diode drive power value is determined at least partly in response to the current activity level of the at least a selected one of the processor and the video circuit; and
   with the control circuitry in the electronic device, adjusting the drive power to the light-emitting diodes while operating the light-emitting diodes at a non-zero drive power value below the maximum light-emitting diode drive power value.

7. The method defined in claim 6 wherein obtaining the operating status information comprises determining whether the video circuit is actively being used to supply video signals.

8. The method defined in claim 6 wherein obtaining the operating status information comprises determining the current activity level for the video circuit.

9. The method defined in claim 6 wherein obtaining the operating status information comprises determining whether the processor is active.

10. The method defined in claim 6 wherein obtaining the operating status information comprises determining the current activity level for the processor.

11. The method defined in claim 6 further comprising measuring temperature within the electronic device using a temperature sensor, wherein the maximum light-emitting diode drive power value is determined at least partly based on the temperature measured with the temperature sensor.

12. The method defined in claim 11 wherein the light-emitting diodes are mounted on a substrate within a backlight unit for the display, wherein the temperature sensor comprises a thermistor mounted on the substrate, and wherein measuring the temperature comprises measuring the temperature using the thermistor.

13. An electronic device, comprising:
   a display having light-emitting diodes that generate backlight for the display and that operate at an operating temperature, wherein the light-emitting diodes are mounted adjacent to one another;
   at least one electronic component; and
   control circuitry that determines a current activity level of the at least one electronic component, estimates a current temperature based on the current activity level of the at least one electronic component, and applies a drive power to the light-emitting diodes that has a value that is bounded by a maximum light-emitting diode drive power value, wherein the maximum light-emitting diode drive power value is determined based at least partly on the estimated temperature, and wherein the control circuitry is configured to adjust the drive power to the light-emitting diodes while operating the light-emitting diodes at a non-zero drive power value below the maximum light-emitting diode drive power value.

14. The electronic device defined in claim 13 wherein the at least one electronic component comprises a video circuit that is configured to produce video signals at the current activity level, wherein the current activity level of the video circuit influences the operating temperature of the light-emitting diodes, and wherein the control circuitry is further configured to apply the drive power to the light-emitting diodes at a level that is selected based at least partly on the current activity level of the video circuit.

15. The electronic device defined in claim 13 wherein the at least one electronic component comprises a processor integrated circuit in the control circuitry that is configured to operate at the current activity level, wherein the current activity level of the processor integrated circuit influences the operating temperature of the light-emitting diodes, and wherein the control circuitry is further configured to apply the drive power to the light-emitting diodes at a level that is selected based at least partly on the current activity level of the processor integrated circuit.

16. The electronic device defined in claim 13 further comprising a substrate on which the light-emitting diodes are mounted, the electronic device further comprising a temperature sensor mounted on the substrate, wherein the control circuitry is configured to select the level for the drive power based at least partly on signals from the temperature sensor.

17. The electronic device defined in claim 13 wherein the control circuitry is configured to select the level for the drive power based at least partly on whether the at least one electronic component is active.

18. The electronic device defined in claim 13 wherein the at least one electronic component comprises a plurality of electronic components that generate heat when active and wherein the control circuitry is configured to adjust the maximum light-emitting diode drive power level as a function of which of the electronic components are active.

19. The electronic device defined in claim 18 wherein the at least one electronic component is selected from the group consisting of: a processor integrated circuit, a video driver circuit, a communications circuit, and a camera flash.

20. An electronic device, comprising:
a display having an array of organic light-emitting diode pixels that generate an image and that operate at an operating temperature;
at least one electronic component; and
control circuitry that determines a current activity level of the at least one electronic component, estimates the operating temperature based on the current activity level of the at least one electronic component, and applies drive powers to the organic light-emitting diode pixels at levels that are selected based at least partly on the estimated operating temperature, wherein the drive power levels that are applied to the organic light-emitting diode pixels are bounded by a maximum drive power value, wherein the maximum drive power value is determined based at least partly on the estimated operating temperature, and wherein the control circuitry is configured to adjust the drive power levels that are applied to the organic light-emitting diode pixels while operating the organic light-emitting diode pixels at a non-zero drive power level below the maximum drive power value.

21. The electronic device defined in claim 20 further comprising:
a temperature sensor that is configured to measure the operating temperature.

22. The electronic device defined in claim 20 wherein the at least one electronic component comprises a video circuit that is configured to produce video signals at the current activity level, wherein the current activity level of the video circuit influences the operating temperature of the organic light-emitting diode pixels, and wherein the control circuitry is further configured to apply the drive powers to the organic light-emitting diode pixels at levels that are selected based at least partly on the current activity level of the video circuit.

23. The electronic device defined in claim 20 wherein the at least one electronic component comprises a processor integrated circuit in the control circuitry that is configured to operate at the current activity level, wherein the current activity level of the processor integrated circuit influences the operating temperature of the organic light-emitting diode pixels, and wherein the control circuitry is further configured to apply the drive powers to the organic light-emitting diode pixels at levels that are selected based at least partly on the current activity level of the processor integrated circuit.

24. The electronic device defined in claim 20 wherein the at least one electronic component comprises a plurality of electronic components that generate heat when active, wherein the control circuitry is configured to apply the drive powers to the organic light-emitting diode pixels at levels that are bounded by a maximum allowable drive power level, and wherein the control circuitry is configured to adjust the maximum allowable drive power levels as a function of which of the electronic components are active.

25. The electronic device defined in claim 20 wherein the at least one electronic component is selected from the group consisting of: a processor integrated circuit, a video driver circuit, a communications circuit, and a camera flash.

* * * * *